June 1, 1926.
J. W. DAVIES
1,586,786
SNOWPLOW ATTACHMENT FOR AUTOMOBILES
Filed May 11, 1923
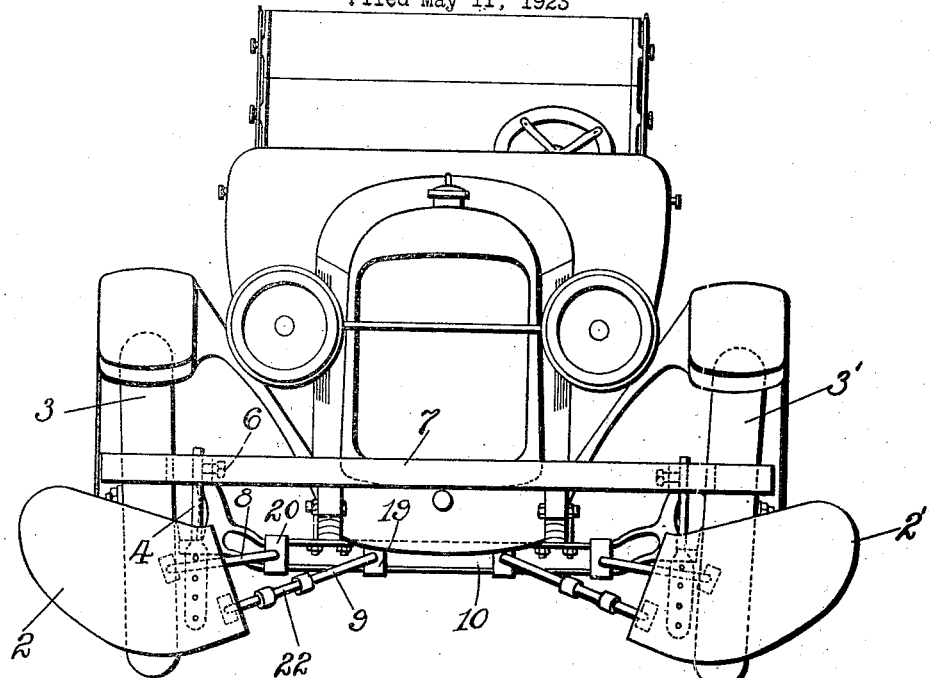
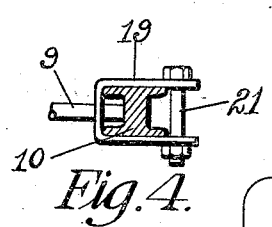
Fig.4.
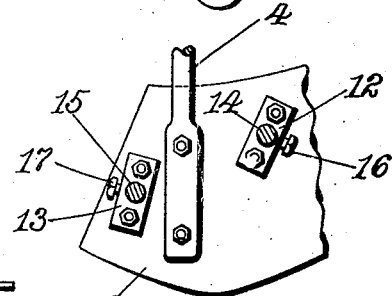
Fig.3.
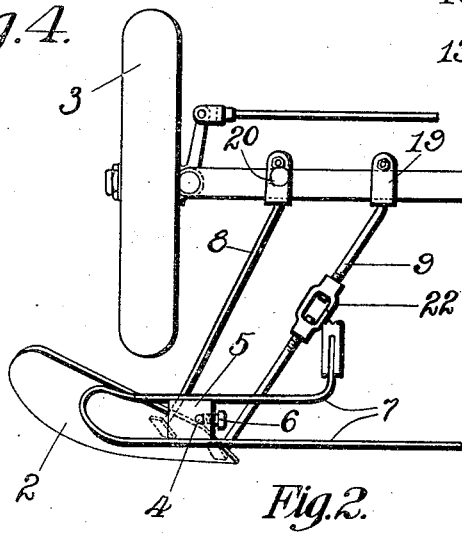
Fig.2.
Inventor.
John W. Davies
by J. H. McCurdy
his Atty.

Patented June 1, 1926.

1,586,786

UNITED STATES PATENT OFFICE.

JOHN W. DAVIES, OF READING, MASSACHUSETTS.

SNOWPLOW ATTACHMENT FOR AUTOMOBILES.

Application filed May 11, 1923. Serial No. 638,204.

Considerable difficulty is experienced in driving an automobile over a road covered with snow to any substantial depth. It is often necessary, however, to operate motor vehicles under these conditions, and this is particularly true of motor driven fire apparatus. When a suitable track has once been made through the snow an automobile can usually be driven with considerable assurance that it will not be stalled, but the making of this initial track frequently is a very troublesome matter. In rural districts where the use of motor vehicles is generally abandoned through the winter and sleighs and sleds are used in place of them, the track made by such sleighs and sleds is not usually wide enough to accommodate a motor driven vehicle, particularly a truck or a piece of motor driven fire apparatus.

The present invention deals with the problem presented by these conditions and it is the chief object of the invention to devise an attachment for motor vehicles which will permit their use in depths of snow that otherwise would make such use impossible.

The nature of the invention will be readily understood from the following description when read in connection with the accompanying drawings, and the novel features will be particularly pointed out in the appended claims.

In the drawings,

Figure 1 is a front elevation of an automobile equipped with snow plow attachments constructed in accordance with this invention;

Fig. 2 is a plan view of one of the attachments shown in Fig. 1, and the adjacent parts that cooperate immediately with it;

Fig. 3 is a rear elevation of the plow share; and

Fig. 4 is a cross-sectional view of a detail of construction.

In the construction shown a plow share 2, which may be of any suitable form, is supported immediately in front of the front wheel 3 of the automobile. The weight of the plow share is supported by a vertical rod 4, the lower end of which is flattened out and riveted to the back of the plow share, as best shown in Fig. 3. The upper end of this rod projects through a hole in a block 5 and is secured to the block by a set screw 6. This block is secured between the arms of a bumper 7 of a type commonly used on automobiles and which forms, in effect, a bracket.

For the purpose of supporting the plow share against the thrust that will be exerted upon it by the snow, two thrust rods 8 and 9 are arranged to connect the plow share with the front axle 10 of the vehicle. Referring to Fig. 3 it will be seen that two blocks 12 and 13, respectively, are bolted to the back of the plow share and are drilled to provide sockets 14 and 15 in which the front ends of the thrust rods 8 and 9, respectively are entered. The rods are secured to these blocks by set screws 16 and 17. The opposite ends of these thrust rods are supported in U-shaped straps or holders 19 and 20, respectively, which are clamped to the front axle 10. Referring to Fig. 4 it will be seen that the strap or holder 19 is clamped on the axle 10 by means of a bolt 21 and that it has a hole therein through which the rearward end of the thrust rod 9 projects, the extremity of this rod bearing against the axle 10. The other rod 8 is similarly connected to the axle.

In installing this attachment on the vehicle, the rod 4 is first secured in the block 5. The thrust rod 8 is next placed in its operative position, the plow share being swung far enough in a clockwise direction, referring to Fig. 2, to force the two ends of the rod firmly against the plow share and the axle, respectively. The front end of this rod is then fastened in this position by the set screw 16. The rod 9 is shortened sufficiently by turning the turn buckle 22 to enable it to be placed in its operative position, and the turn buckle is then rotated to lengthen this rod until its ends bring up firmly against the plow share and axle, respectively. The forward end of this rod is next clamped by turning up the set screw 17. The apparatus then is ready for use. To dismount the apparatus it is merely necessary to reverse the operations above described.

A similar plow share 2' is mounted in front of the opposite front wheel 3' in the same manner that the plow share 2 is mounted. This arrangement is clearly shown in Fig. 1.

When a motor vehicle equipped with these plow attachments is driven over a road covered with a substantial depth of snow, the plow shares push the snow aside out of the way of the wheels. I have found it possible through the use of these attachments to drive a motor vehicle under circumstances that would make driving absolutely impossible without them. Under some circumstances one plow share only is necessary, as for instance, where a well beaten track has been made but the track is too narrow for the vehicle to be driven. It is preferable, however, to use two. These attachments are particularly valuable on motor driven fire apparatus since such apparatus is likely to be called to a fire in some remote district where it is necessary to drive over poorly broken out roads, or possibly over roads that are not broken out at all. It is often impossible for motor driven apparatus to respond to such a fire immediately after a heavy snow fall, but by using attachments of the character above described, such apparatus can be driven safely through a very considerable depth of snow.

It will be noted that since the plow share can pivot about the axis of the rod 4 and since the relative lengths of the thrust rods are adjustable, it is possible to adjust the plow share so that the greater part of the thrust of the snow will come on a line between the rods. The rods engage the plow share at opposite sides of the axis of the rod 4 so that the plow share is prevented from turning or twisting about this axis while in operation. It will be appreciated that the particular method of mounting the device will vary with the construction of the vehicle to which it is to be applied, and that various expedients may be adopted for this purpose.

Having thus described my invention, what I desire to claim as new is:

1. In an automobile, the combination of a bracket secured to the body of the automobile, a plow share, an upright rod secured to said plow share and adjustably mounted in said bracket, said bracket and rod supporting said plow share in front of one of the forward wheels of the automobile and permitting a swinging adjustment of said plow share about the axis of said rod, and two rods connecting the front axle of the automobile with points on said plow share at opposite sides of said axis.

2. In an automobile, the combination of a plow share, means for connecting said plow share with the body of the automobile to support the plow share in front of one of the wheels of the automobile, whereby said plow share will push aside snow from in front of said wheel, and two thrust rods connecting said plow share with a part of the chassis of the automobile and resisting the thrust of the snow against said plow share.

3. In an automobile, the combination of a plow share, a bracket secured to the body of the automobile, a rod connecting said bracket with said plow share and supporting the plow share in front of one of the forward wheels of the automobile, whereby said plow share will push aside snow from in front of said wheel, and two thrust rods connecting said plow share with the front axle of the automobile, said rods preventing the plow share from tipping and supporting it against the thrust of the snow.

4. In an automobile, the combination of a plow share, a bracket secured to the body of the automobile, a rod connecting said bracket with said plow share and supporting the plow share in front of one of the forward wheels of the automobile, whereby said plow share will push aside snow from in front of said wheel, and two thrust rods connecting the front axle of the automobile with said plow share at opposite sides of the axis of said rod, said thrust rods supporting said plow share against the thrust of the snow and one of said thrust rods including a turn buckle, whereby its length may be adjusted.

JOHN W. DAVIES.